April 3, 1962  G. A. DMITROFF  3,027,704
POWER AND STARTING SYSTEM FOR ENGINES
Filed July 24, 1959  2 Sheets-Sheet 1

INVENTOR
GEORGE A. DMITROFF
BY Jack N. M. Carthy
AGENT

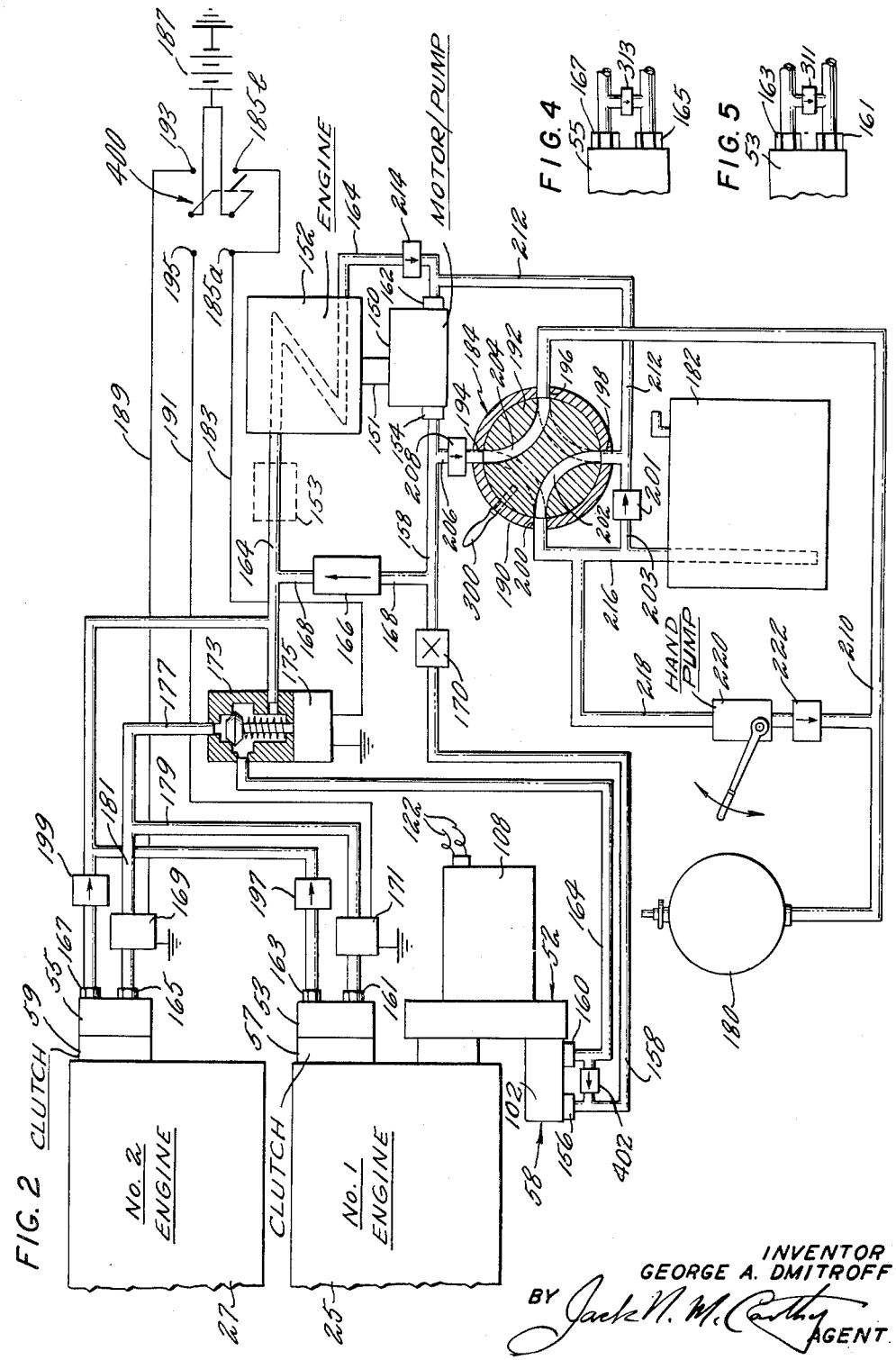

United States Patent Office 3,027,704
Patented Apr. 3, 1962

3,027,704
POWER AND STARTING SYSTEM FOR ENGINES
George A. Dmitroff, Trumbull, Conn., assignor to United Aircraft Corporation, East Hartford, Conn., a corporation of Delaware
Filed July 24, 1959, Ser. No. 829,384
5 Claims. (Cl. 60—6)

This invention relates to power and starting systems for making aircraft self-sufficient in that all necessary ground power and power for starting will be supplied by the aircraft.

An object of this invention is to provide power means which can be operated to supply motive force to the starting system of an aircraft.

Another object of this invention is to provide a power and starting system for an aircraft which will provide a weight saving over other known systems.

A further object of this invention is to provide an aircraft with an integrated ground power and starting system which will operate the regular aircraft generator and start the engine so that it can take over generator operation.

Another object of this invention is to provide a supplemental power system controlling the aircraft generator and starter which will give improved operation in cold weather.

A further object of this invention is to provide a power and starting system which makes a higher voltage available from the electrical system during cranking of the engine.

These and other objects and advantages of the invention will be evident or may be pointed out in connection with the following detailed description of the drawings in which one embodiment of the invention is illustrated.

In the drawings:

FIG. 2 is a diagrammatic view showing the power and starting system for operating the aircraft generator starter along with a portion of each of the two aircraft engines;

FIG. 4 is a view showing a check valve between the outlet of starter motor 55 and its inlet; and FIG. 5 is a view showing a check valve between the outlet of starter motor 53 and its inlet.

Figure 1:
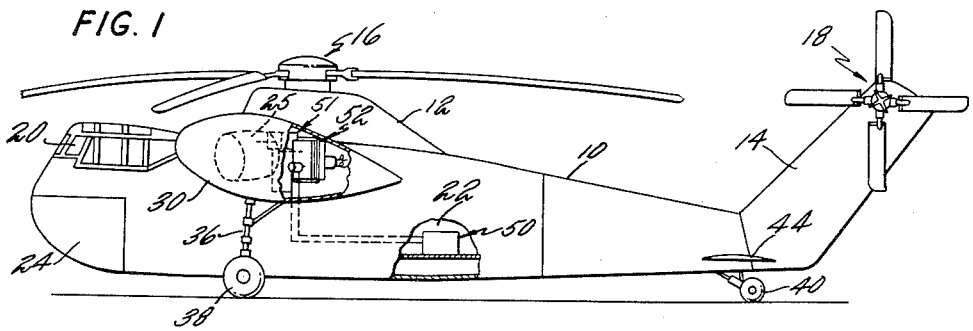
FIG. 1 is a side elevation of a helicopter showing the location of the system.

Referring to FIG. 1, the helicopter comprises essentially an elongated fuselage 10 having a main rotor pylon 12 and a tail rotor pylon 14 on which are mounted the main rotor generally indicated at 16 and a tail rotor generally indicated at 18.

The fuselage has a pilot compartment 20 ahead of the main rotor pylon 12, which is located in the upper part of the nose section of the fuselage. The space beneath the pilot compartment extends well aft beneath the main rotor and comprises the main cargo or passenger compartment 22 of the aircraft. Access to the cargo compartment is gained through a pair of clamshell doors 24 in the nose of the fuselage.

Engines 25 and 27 are mounted one each in engine nacelles 30. An engine nacelle 30 is supported one on each side of the fuselage 10 at the end of a short wing section. These wings project laterally from the upper portion of the fuselage in the vicinity of the main rotor pylon.

The aircraft is supported on the ground by tricycle landing gear including main oleo struts 36 by wheels 38 which depend from the nacelles 30 and by a tail wheel 40 depending from the fuselage just forward of the tail rotor pylon 14. Stabilizer surfaces 44 extend outwardly and downwardly on each side of the tail pylon 14.

The main rotor is driven by an upright shaft which extends through the pylon 12 from a gear box located under said pylon. The engines are disposed in nacelles 30 to drive shafts extending through the wings into the gear box. Other details of construction of a helicopter of this type are disclosed in United States Patent No. 2,755,038 issued July 17, 1956, to M. E. Gluhareff for a Helicopter-Airplane With Engines Mounted on Fixed Wings.

The power and starting system set forth by this invention comprises three main parts which are (1) the driving device 52 for mounting the aircraft generator 108 so that it may be driven by an aircraft engine 25 or by an auxiliary power device 58, (2) the starting system 51 for starting the engines 25 and 27, engine 25 will drive generator 108, and (3) an auxiliary power system 50 for operating the power device 58 and the hydraulic starter motors 53 and 55.

The main portion of the auxiliary power system 50 making this aircraft self-sufficient in its operation in the air and on the ground is located within the compartment 22 while the auxiliary power device 58 along with the driving device 52 and the starter motors 53 and 55 are located adjacent the aircraft engine.

Figure 3:
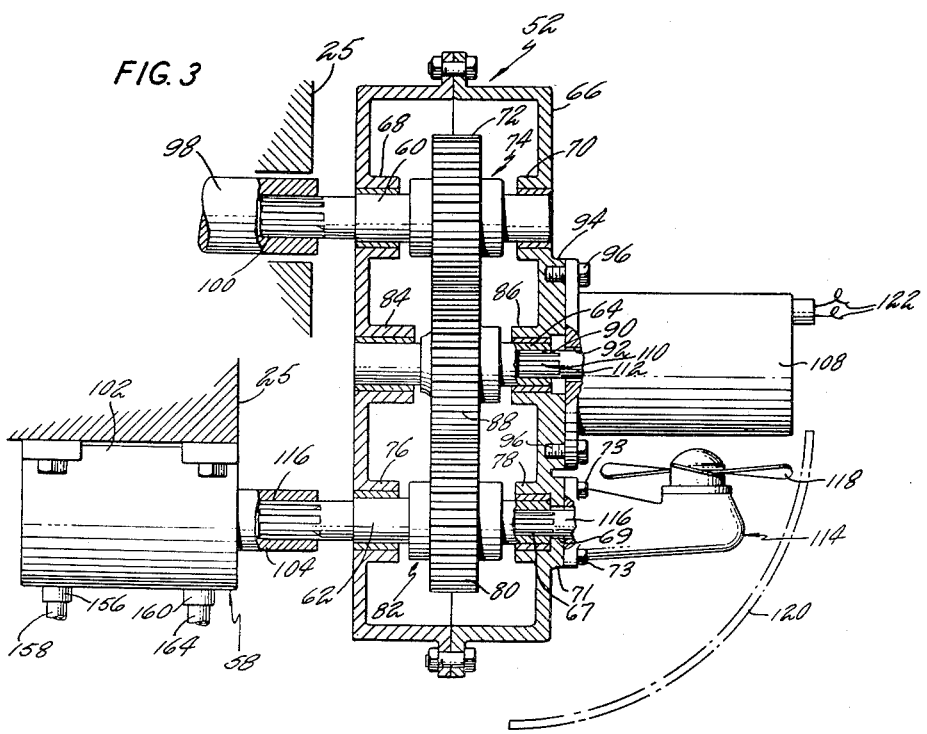
FIG. 3 is an enlarged view of the drive unit located between the aircraft and auxiliary engines and the generator showing a fan for generator cooling.

The driving device 52, see FIG. 3, is a transmission unit having two input shafts 60 and 62 and one output shaft 64. This device or unit 52 comprises a two-piece housing 66 in which the two input shafts and output shaft are rotatably mounted. Shaft 60 is mounted within the housing 66 on bearings fixed within bosses 68 and 70. A gear 72 is mounted on said shaft by a free wheeling unit or one-way drive clutch 74. Shaft 62 is mounted within the housing 66 on bearings fixed within bosses 76 and 78. A gear 80 is mounted on said shaft by a free wheeling unit or one-way drive clutch 82. One end of shaft 60 extends to the exterior of housing 66 and is splined at its end and one end of shaft 62 extends to the exterior of housing 66 and is splined at its end. The other end of shaft 62 is recessed and formed with internal splines 67. An opening 69 in the side of housing 66 permits access to said splined recess. A mounting pad 71 having bolts 73 is formed around the opening 69.

Shaft 64 is mounted within the housing 66 on bearings fixed within bosses 84 and 86. A gear 88 is fixedly mounted on shaft 64. This may be done by means of a key. One end of shaft 64 is recessed and formed with internal splines 90. An opening 92 in the side of housing 66 permits access to said splined recess. A regular accessory mounting pad 94 having bolts 96 is formed around the access opening on housing 66.

Shafts 60, 62 and 64 are positioned within housing 66 so that gear 72 meshes with gear 88 and gear 80 meshes with gear 88. The free wheeling unit or one-way drive clutch 74 is arranged so that rotation of input shaft 60 will rotate gear 72 which will in turn rotate gear 88 and rotation of gear 72 by gear 88 will not transmit any force to shaft 60. The free wheeling unit 82, similar to unit 74, is arranged so that rotation of input shaft 62 will rotate gear 80 which will in turn rotate gear 88 and rotation of gear 80 by gear 88 will not transmit any force to shaft 62. This transmission unit permits shaft 64 to be driven by either shaft 60 or shaft 62 without feeding back any force into the shaft not in operation or which is rotating at a slower speed.

The mounting device or transmission unit 52 can be mounted within a nacelle 30 by any satisfactory means. This device or unit is mounted so that an engine accessory drive shaft 98 having an internally splined section 100 engages the external splines of shaft 60. An auxiliary power device 58, having a hydraulic motor 102 with an output shaft 104 is mounted on aircraft structure so that said shaft 104 is positioned to actuate shaft 62. This drive is made similar to the engine accessory drive shaft connection by having internal splines 116 on the end of shaft 104 to engage the external splines of shaft 62.

An aircraft generator 108 is mounted on mounting pad 94 by use of the bolts 96 with the external splines 110 on its drive shaft 112 extending through the access opening 92 on housing 66 and engaging the internal splines 90 of output shaft 64. A fan unit 114 is mounted on mounting pad 71 by use of bolts 73. Fan drive shaft 116 is positioned having external splines on its free end extending through opening 69 and engaging internal splines 67 of shaft 62. Fan 118 of said fan unit is located so as to direct its cooling air flow over generator 108 and if necessary over finned areas of housing 66. A shield or air flow guide 120, shown in phantom in FIG. 3, can be used if desired. While a separate fan has been shown, a generator having an integral fan can be used. Electrical lines 122 extending from the generator can be used to provide electrical power to devices necessary for aircraft operation either in the air or on the ground.

The starting system 51 includes two hydraulic starter motors 53 and 55 connected through overrunning clutches 57 and 59, respectively, to cooperating starting gears within the No. 1 engine and the No. 2 engine, engines 25 and 27, respectively. The clutches are provided to disengage the hydraulic motors from the engines at a predetermined speed.

The auxiliary power system 50 for operating the power device 58 and the hydraulic starter motors 53 and 55 by directing a fluid thereto includes (1) means for driving said hydraulic motors and (2) means for starting said driving means.

The driving means for supplying an actuating fluid to the hydraulic motors includes a hydraulic motor pump 150 driven by the drive shaft 151 of an internal combustion engine 152. The engine 152 can be one of a number of known existing types. This engine is a non-propulsion engine, that is, this engine does not drive either the main rotor or tail rotor. However, this engine could be used to power hydraulic accessories such as landing gear actuators, taxi gear and so forth. The outlet 154 of hydraulic motor/pump 150 is connected to the inlet 156 of hydraulic motor 102 by conduit 158. The outlet 160 of the hydraulic motor 102 is connected to the inlet 162 of the hydraulic motor/pump 150 by conduit 164. A check valve 402 is provided between conduit 164 and 158 so that it connects the outlet 160 of the hydraulic motor 102 to the inlet 156. This check valve 402, as indicated by the arrow thereon in FIG. 2, permits flow from the outlet 160 to the inlet 156.

The inlets 161 and 165 of hydraulic starter motors 53 and 55, respectively, are connected through solenoid starter valves 169 and 171 to a directing or diverter valve 173 located in conduit 164.

Directing valve 173 is solenoid operated and biased to a position which permits flow through conduit 164 from the outlet 160 of the auxiliary power device 58 to the hydraulic motor/pump 150. When the solenoid 175 is actuated, the directing valve 173 is positioned so that fluid is directed therethrough from conduit 164 to conduit 177. This action of the valve closes off the flow of fluid directly through the valve to the hydraulic motor/pump 150.

While directing or diverter valve 173 has been shown located in conduit 164 to provide a series relationship between hydraulic motor 102 and hydraulic starter motors 53 or 55, a parallel connection can be made in which conduit 177 is connected to conduit 158 between valve 170 and inlet 156 of hydraulic motor 102. This conduit 177 could be connected to conduit 158 by a simple T-joint with a valve located in the conduit 177 or conduit 177 could be connected to conduit 158 by a valving arrangement which permits flow from valve 170 either to inlet 156 alone or to inlet 156 and to the "on-off" valves 169 and 171 located between conduit 177 and the inlets 165 and 161 of the hydraulic starter motors 55 and 53, respectively. A constant flow-type pump is adapted for use with the arrangement having the flow in series and a variable flow-type pump is adapted for use with the arrangement having the flow in parallel.

The inlet 161 of hydraulic starter motor 53 is connected to conduit 177 by a conduit 179 and the inlet 165 of hydraulic starter motor 55 is connected to conduit 177 by conduit 181. The solenoid "on-off" starter valve 171 is located in conduit 179 and solenoid "on-off" starter valve 169 is located in conduit 181. The outlets 163 and 167 of hydraulic starter motors 53 and 55, respectively, may be connected to their inlets 161 and 165 by check valves 311 and 313, respectively, permitting flow only from an outlet to an inlet (see FIGS. 4 and 5).

The solenoid of directing valve 173 is connected to ground and connected through an electrical line 183 to two terminal points 185a and 185b of the double-pole double-throw switch 400. Solenoid starter valves 169 and 171 are grounded and are connected by electrical lines 189 and 191, each to terminal points 193 and 195, respectively, of the double-pole double-throw switch 400. Solenoid starter valves 169 and 171 are of the type which are biased to a closed or "off" position and are opened when a current is passed through their solenoids. Therefore, the movement of switch 400 to the left will connect terminals 195 and 185a to the power source 187 thereby moving the moveable portion of valve 173 downwardly so that it will block off flow out of valve 173 to hydraulic motor/pump 150 and direct flow into conduit 177 and placing valve 171 in its open position. Movement of switch 400 to the right will connect terminals 193 and 185b to the power source 187 thereby moving the moveable portion of valve 173 downwardly so that it will block off flow out of valve 173 to hydraulic motor/pump 150 and direct flow into conduit 177 and placing valve 169 in its open position. The outlets 163 and 167 of the hydraulic starter motors are connected to conduit 164 at a point between the directing valve 173 and hydraulic motor/pump 150 through check valves 197 and 199, respectively.

Both conduits 158 and 164 may be finned if required for heat rejection. The conduit 164 is shown extending through the engine 152. This is shown in this manner as the oil is used for cooling the engine. An external oil cooler 153 can be used if necessary. A case drain line (not shown) may be provided connecting the hydraulic motor with reservoir 182 to compensate for minute leakage past the hydraulic motor elements. A pressure relief valve 166 is placed in a conduit 168 connecting conduits 158 and 164. Valve 166 is used to bypass the hydraulic motor 102 in the event of failure or closing of valve 170 and to indicate when the pressure in conduit 158 has reached a predetermined value. A blocking valve 170 is interposed in conduit 158 between the point where conduit 168 connects with conduit 158 and the inlet 156 of the hydraulic motor. Valve 170 blocks off flow of fluid to hydraulic motor 102 when starting engine 152 and is used to obtain maximum pressure for accumulator 180 to be hereinafter described. Valve 170 may open automatically when valve 166 opens. As valve 166 closes, valve 170 remains open to permit the fluid to flow from motor/pump 150 to motor 102. Valve 170 may be automatically closed when valve 184 is placed in start position. A solenoid starter valve may be placed in conduit 158.

The starting means for engine 152 includes an accumulator 180 and a reservoir 182. A two-position valve 184, having one position for starting and idling engine 152 and one position for normal operation of system when said engine is running, connects said accumulator and reservoir to conduits 164 and 158. Two-position valve 184 comprises a housing 190 having a rotatable porting member 192 therein. Housing 190 has four openings 194, 196, 198 and 200 therein. Porting member 192, which is movable between two positions, contains two passageways 202 and 204 therethrough. In the valve "run" position, passageway 202 connects opening 198 with opening 200 and passageway 204 connects opening 194 with opening 196. In its "start" position, porting member 192 has passageway 202 connecting opening 196 with 198 and passageway 204 connecting opening 194 with opening 200. Valve 184 can be actuated by a manual lever 300 fixed thereto. The "start" position of the valve 184 allows cold temperature warm-up of non-propulsion engine.

Conduit 206 connects conduit 158, between outlet 154 of the hydraulic motor/pump 150 and the connection of conduit 168 to conduit 158, to opening 194. A one-direction check valve 208 is located in conduit 206 to permit flow only from conduit 158 to opening 194. Conduit 210 connects accumulator 180 to opening 196. A conduit 212 connects conduit 164 to opening 198. One-way check valve 214 is interposed in conduit 164 between engine 152 and the point where conduit 212 is connected therewith. This check valve 214 permits flow only in a direction from engine 152. Conduit 216 connects reservoir 182 to opening 200. A one-way check valve 201 is located in a conduit 203 connected between conduit 216 and conduit 212. This check valve permits flow only in the direction from conduit 216 to conduit 212. While a vent is shown on reservoir 182, it may be pressurized.

In the event of loss of pressure in the accumulator 180, a conduit 218 is located connecting conduit 216 with conduit 210, said conduit 218 having a hand pump 220 interposed therein and a check valve 222 which permits flow only in a direction from said reservoir 182 to conduit 210.

*Operation*

When the aircraft does not have engine 25 operating and it is desired to operate the aircraft generator 108, said generator is driven by hydraulic motor 102 through gears 80 and 88. Gear 88 will in turn rotate gear 72, but in view of the free wheeling unit 74, no force will be transmitted to shaft 60. Hydraulic motor 102 rotates shaft 62 which imparts its motion to gear 80 through the free wheeling unit 82. Shaft 62 is also operatively connected to fan drive shaft 116 for operating the fan when the generator is being driven by the hydraulic motor 102. Hydraulic fluid is delivered to the hydraulic motor through conduit 158 by a hydraulic motor/pump 150. Motor/pump 150 is driven by engine 152 through drive shaft 151.

Automatic means are provided for starting engine 152 which includes an accumulator 180 for delivering fluid under pressure to the inlet of motor/pump 150 to "turn over" drive shaft 151. While an automatic means for starting engine 152 has been provided, a conventional manual starting system would also be provided in the event of any emergency.

When valve 184, having a "run" and "start" position, is placed in its "start" position, the inlet 162 of the hydraulic motor/pump 150 is connected to the accumulator 180 and the outlet 154 is connected to the reservoir 182 by a one-way check valve. This permits fluid to flow through the hydraulic motor/pump, with flow in the other direction being prevented by check valve 214. This action "turns over" drive shaft 151. Blocking valve 170 is in a closed position thereby directing flow to the reservoir 182 for starting.

When valve 184 is placed in its "run" position, the outlet 154 of the hydraulic motor/pump is connected to the accumulator 180. In this position, the inlet of motor/pump 150 is connected to the reservoir 182. This provides for recharging of the accumulator and a supply of fluid to the system. When valve 184 has been placed in this "run" position, blocking valve 170 is opened when relief valve 166 opens and stays open when valve 166 closes, which indicates that the accumulator has been recharged and the motor/pump 150 is operating to supply motive fluid to motor 102.

When motive fluid is being supplied to motor 102, and generator 108 is operating, the directing valve 173 may be positioned to direct fluid to the solenoid starter valves 169 and 171. This is done by closing switch 400 to either of its two positions. This temporarily blocks off the flow of fluid from directing valve 173 directly to hydraulic motor/pump 150. When switch 400 is closed to its "left" position, see FIG. 2, the solenoid starter valve 171 is opened, to permit the motive fluid to be directed through hydraulic starter motor 53. The motive fluid passes from this hydraulic starter motor through check valve 197 back to conduit 164 between the directing valve 173 and hydraulic motor/pump 150. As the No. 1 engine starts, the engine through accessory drive shaft 198 drives generator 108 through the gears 72 and 88. Gear 88 will in turn rotate gear 80, but in view of the free wheeling unit 82, no force will be transmitted to shaft 62. With engine 25 supplying the driving power to generator 108, switch 400 is opened. When switch 400 is closed to its "right" position, the solenoid starter valve 169 is opened to permit the motive fluid to be directed through hydraulic starter motor 55. The motive fluid passes from this hydraulic starter motor through check valve 199 back to conduit 164 between the directing valve 173 and hydraulic motor/pump 150. As the No. 2 engine starts, the switch 400 is opened.

It is to be understood that the invention is not limited to the figures herein shown and described, but may be used in other ways without departure from its spirit as defined in the following claims. A power system of the type disclosed in this application is shown and claimed in copending application Serial No. 681,556, filed September 3, 1957, now Patent No. 3,006,140, issued October 31, 1961.

I claim:

1. In combination, an engine, an engine accessory, means connecting said engine to said accessory so that said engine can drive said accessory, means for driving said accessory independently of said engine, said last named means including a first hydraulic motor, starting means connected to said engine, said last named means including a second hydraulic motor, means for supplying a motive fluid to said first hydraulic motor to drive said accessory, and means for supplying a motive fluid to said second hydraulic motor from said first hydraulic motor to start said engine and to drive said accessory, said last named means including a valve, said valve being movable between a position directing the flow of motive fluid from said first hydraulic motor to said second hydraulic motor and a position directing the flow of fluid directly to said supplying means.

2. In combination, first power plant means including an engine, an accessory, a first hydraulic driving motor having an inlet and outlet, means connecting said engine and said first motor to said accessory so that either said engine or said first motor can drive said accessory, means for supplying a motive fluid to said first motor, said supplying means including a motor/pump, said motor/pump having an inlet and outlet, means connecting the outlet of said motor/pump to the inlet of said first hydraulic driving motor, said engine having starting means, said starting means including a second hydraulic driving motor having an inlet and outlet, valved means for connecting the outlet of said first hydraulic driving motor to the inlet of said second hydraulic driving motor or to the inlet of said motor/pump.

3. In combination, first power plant means including an engine, an accessory, a first hydraulic driving motor having an inlet and outlet, means connecting said engine and said first motor to said accessory so that either said engine or said first motor can drive said accessory, means for supplying a motive fluid to said first motor, said supplying means including a motor/pump, said motor/pump having an inlet and outlet, said supplying means including a first conduit connecting the outlet of said motor/pump to the inlet of said first hydraulic driving motor, said engine having starting means, said starting means including a second hydraulic driving motor having an inlet and outlet, means including a second conduit connecting the outlet of said first hydraulic driving motor to the inlet of said second hydraulic driving motor, a solenoid operated "on-off" valve located in said second conduit, and means connecting the outlet of said second hydraulic driving motor to the inlet of said motor/pump.

4. In combination, first power plant means including an engine, an accessory, a first hydraulic driving motor having an inlet and outlet, means connecting said engine and said first motor to said accessory so that either said engine or said first motor can drive said accessory, means for supplying a motive fluid to said first motor, said supplying means including a motor/pump, said motor/pump having an inlet and outlet, means connecting the outlet of said motor/pump to the inlet of said first hydraulic driving motor, said engine having starting means, said starting means including a second hydraulic driving motor having an inlet and outlet, a diverter valve having one inlet and two outlets, said valve being operable to connect one of its outlets to its inlet at a time, means connecting the outlet of said first hydraulic driving motor to the inlet of said valve, and means connecting one outlet of said valve to the inlet of said motor/pump and connecting the other outlet to the inlet of said second hydraulic driving motor.

5. In combination, first power plant means including an engine, an engine accessory, a first hydraulic driving motor having an inlet and outlet, means connecting said engine and said first motor to said accessory so that either said engine or said first motor can drive said accessory, means for supplying a motive fluid to said first motor, said supplying means including a motor/pump, said motor/pump having an inlet and outlet, means connecting the outlet of said motor/pump to the inlet of said first hydraulic driving motor, said engine having starting means, said starting means including a second hydraulic driving motor having an inlet and outlet, a diverter valve having one inlet and two outlets, said valve being operable to connect one of its outlets to its inlet at a time, means connecting the outlet of said first hydraulic driving motor to the inlet of said valve, and means connecting one outlet of said valve to the inlet of said motor/pump and connecting the other outlet to the inlet of said second hydraulic driving motor, and means connecting the outlet of said second hydraulic driving motor to the inlet of said motor/pump.

References Cited in the file of this patent

UNITED STATES PATENTS

| | | |
|---|---|---|
| 2,070,615 | Plante | Feb. 16, 1937 |
| 2,112,466 | Maloon | Mar. 29, 1938 |
| 2,466,358 | Besserdich et al. | Apr. 5, 1949 |
| 2,553,584 | Hirsch et al. | May 22, 1951 |
| 2,557,933 | Beaman et al. | June 26, 1951 |
| 2,723,531 | Wosika et al. | Nov. 15, 1955 |
| 2,906,088 | Clark | Sept. 29, 1959 |